United States Patent [19]

Fukushima et al.

[11] Patent Number: 5,237,553
[45] Date of Patent: Aug. 17, 1993

[54] DATA RECORDING AND REPRODUCING APPARATUS HAVING A PLURALITY OF OPERATING MODES

[75] Inventors: Yoshihisa Fukushima, Osaka; Isao Satoh, Neyagawa; Yuji Takagi, Hirakata; Yasushi Azumatani, Neyagawa; Hiroshi Hamasaka, Nishinomiya, all of Japan

[73] Assignee: Matsushita Electric Industrial Co., Kadoma, Japan

[21] Appl. No.: 705,540

[22] Filed: May 24, 1991

[30] Foreign Application Priority Data

May 24, 1990 [JP] Japan .................................. 2-135021

[51] Int. Cl.⁵ ................................................ G11B 7/00
[52] U.S. Cl. ........................................ 369/58; 369/32; 369/47; 369/54; 369/275.3
[58] Field of Search ..................... 369/32, 47, 48, 54, 369/58, 59, 124, 275.3

[56] References Cited

U.S. PATENT DOCUMENTS

| | | | |
|---|---|---|---|
| 4,821,254 | 4/1989 | Satoh et al. | 369/58 X |
| 4,833,665 | 5/1989 | Tokumitsu et al. | 369/58 |
| 4,962,494 | 10/1990 | Kimura | 369/58 X |
| 4,969,139 | 11/1990 | Azumatani et al. | 369/58 X |
| 5,005,165 | 4/1991 | Yamanaka et al. | 369/58 |
| 5,107,481 | 4/1992 | Miki et al. | 369/58 X |
| 5,111,444 | 5/1992 | Fukushima et al. | 369/58 |
| 5,130,969 | 7/1992 | Sako | 369/58 |
| 5,132,956 | 7/1992 | Ichikawa | 369/58 X |

OTHER PUBLICATIONS

Draft Proposal 10089 presented by ISO/SC23, Oct. 25, 1989, Japan.

Primary Examiner—W. R. Young

[57] ABSTRACT

In data recording medium used with the apparatus of the present invention, there are allocated a sequential access zone consisting of a data area for recording real time data such as sounds or video images, a C list area for recording a C defect list managing defective sectors detected in the formatting process, and a G list area for recording a G defect list managing defective sectors detected in the recording process of data, and a random access zone consisting of a data area for recording random access data such as code data, a spare area for replacing defective sectors detected in the recording process, and an R list area for recording an R defect list managing the relation between defective sectors and corresponding spare sectors. In the recording process of data in the sequential access zone, data is recorded while defective sectors registered in the C defect list and G defect list are skipped, thereby achieving recording of both the random access data and the real time data. Moreover, sequential reproduction of real time data is realized.

7 Claims, 10 Drawing Sheets

FIG. 3

| VCB HEADER | VCB IDENTIFIER |
| | CONTROL DATA OF VOLUME CONTROL AREA |
| | NUMBER OF ZONES |
| | CONTROL DATA OF UNUSED AREA |
| ZONE ENTRY (1) (FOR SEQUENTIAL ACCESS ZONE) | ZONE IDENTIFIER |
| | CONTROL DATA OF C LIST AREA |
| | CONTROL DATA OF G LIST AREA |
| | CONTROL DATA OF DATA AREA |
| ZONE ENTRY (2) (FOR RANDOM ACCESS ZONE) | ZONE IDENTIFIER |
| | CONTROL DATA OF R LIST AREA |
| | CONTROL DATA OF SPARE AREA |
| | CONTROL DATA OF DATA AREA |

FIG. 4(a)
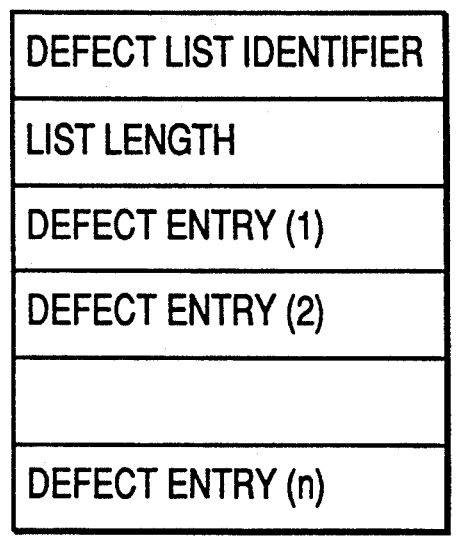
FIG. 4(b)
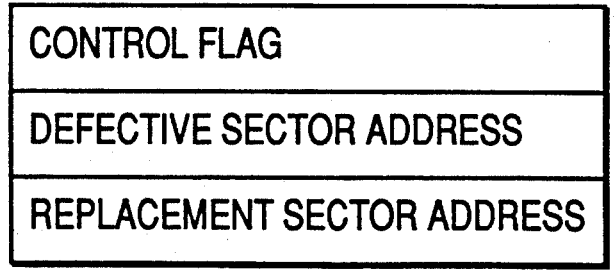
FIG. 4(c)

FIG. 10(a) PRIOR ART

| LOGICAL BLOCK ADDRESS | 0 | 1 | 2 | 3 | 4 | 5 |
|---|---|---|---|---|---|---|

FIG. 10(b) PRIOR ART

| INTERMEDIATE ADDRESS | TRACK = 0 SECTOR = 0 | TRACK = 0 SECTOR = 2 | TRACK = 0 SECTOR = 3 | TRACK = 0 SECTOR = 4 | TRACK = 0 SECTOR = 6 | TRACK = 0 SECTOR = 7 |
|---|---|---|---|---|---|---|

FIG. 10(c) PRIOR ART

| PHYSICAL SECTOR ADDRESS | TRACK = 0 SECTOR = 0 | TRACK = 90 SECTOR = 0 | TRACK = 0 SECTOR = 3 | TRACK = 0 SECTOR = 4 | TRACK = 0 SECTOR = 6 | TRACK = 0 SECTOR = 7 |
|---|---|---|---|---|---|---|

DATA RECORDING AND REPRODUCING APPARATUS HAVING A PLURALITY OF OPERATING MODES

BACKGROUND OF THE INVENTION

1. Field of the Invention

The present invention relates to a data recording and reproducing apparatus having a plurality of operating modes for recording and reproducing data.

2. Description of the Prior Art

Since an optical disk has many defective sectors in comparison with a magnetic disk or the like, efficient management of these defective sectors is necessary for an optical disk apparatus. For example, Draft Proposal 10089 presented by ISO/SC23 describes a defect management technique applied to a 130 mm rewritable optical disk. FIG. 8 is a structural view of areas of the optical disk described in this Draft Proposal. Referring to FIG. 8, a User Zone on the disk is divided into a Definition Zone and a User Area which is further divided into n groups, each group consisting of a Data Area where user data is recorded and a Spare Area where spare sectors are allocated. There are defined three areas in the Definition Zone, namely, a DDS Area where a DDS (Disk Definition Structure) holding all the management or control data of the areas within the User Zone is recorded, a PDL Area where a Primary Defect List stores all of the physical addresses of defective sectors detected through the formatting process, and an SDL Area where a Secondary Defect List stores all of all the physical addresses of the defective sectors detected during recording and the physical addresses of spare sectors by which the defective sectors were replaced. Although these Areas are illustrated as if at one place on the disk in FIG. 8 for brevity, the areas are formed at two places allocated at the inner and outer peripheral portions of the disk to secure high reliability according to the Draft Proposal.

FIGS. 9(a) and 9(b) shows a data structure of the Defect List described in the Draft Proposal; FIG. 9(a) shows the data of the Primary Defect List and FIG. 9(b) shows the data of the Secondary Defect List. A Defect List Identifier for identifying the kind of the defect list and a List Length are recorded at the head of each Defect List, and subsequently Defect Entries corresponding to the respective defective sectors are recorded. (0001)h is recorded at the Defect List Identifier of the Primary Defect List records (0001)h, while (0002)h is recorded at the Defect List Identifier of the Secondary Defect List records. The Defect Entry recorded in the Primary Defect List includes a physical address of a defective sector represented in 4-byte length. On the other hand, a Defect Entry recorded in the Secondary Defect List records physical addresses of both the defective sector and the replaced spare sector represented by a word having a 4-byte length.

The process for Defect Management will be explained below. In the first place, as an option in the formatting process, certification for all the sectors in the user zone is carried out by performing a recording operation and a verifying operation using test data. If defective sectors are detected during this certification, the detected defective sectors are stored in the Primary Defect List. However, new defective sectors are normally found after the formatting process as a result of the degradation of the recording material or a scratch on the disk. To secure sufficient reliability of the recording data, therefore, it becomes necessary to start a verifying operation immediately after the data is recorded. In the case of recording user data, if a defective sector is found in the recording operation and the succeeding verifying operation, the recording data is recorded in a spare sector and moreover, a defect entry comprised of a pair of addresses of the defective sector and its corresponding spare sector is stored in the Secondary Defect List. In the case of recording and reproducing the user data, a logical address of a target sector designated by a host computer is converted to a physical address on the disk with reference to the defect lists. FIGS. 10(a)–10(c) show the relation between the logical address and the physical address. The following description is based on the assumption that two defective sectors (one has a track address=0 and a sector address=1, the other has a track address=0, a sector address=5) are stored in the Primary Defect List, and a spare sector (track address=90, sector address=0) is assigned to one defective sector (track address=0, sector address=2) in the Secondary Defect List. In the first step of the address conversion, the logical address of a target sector shown in FIG. 10(a) is changed to an intermediate address shown in FIG. 10(b) using the Primary Defect List. At this time, the intermediate address is assigned to each sector while sequentially skipping the defective sectors stored in the Primary Defect List from one end of the data area. Then, in the second step, the intermediate addresses stored defective sector addresses are searched from the Secondary Defect List. The physical sector address of the sector (track address=0, sector address=2) stored in the Secondary Defect List is set as an address of the replacement sector recorded in the defect entry. Meanwhile, the physical sector address of a sector not stored in the Secondary Defect List is given as an intermediate address itself. After the physical address of the target sector is obtained in the manner as above, data is recorded on and reproduced from the optical disk.

According to the conventional defect management as described above, all of the defective sectors detected after the formatting process are replaced according to a linear replacement algorithm. Random access data controlled by, e.g., UNIX or MS-DOS are dispersedly recorded on the disk, so that no problem occurs in accessing the data even when the defective sectors in the user zone are replaced with spare sectors in the spare area according to this algorithm. However, if the spare sector is accessed during the reproduction of real time data such as images or sounds that needs continuity, a seek operation occurs between the user zone and spare area, resulting in a time gap in the reproduction of data.

SUMMARY OF THE INVENTION

An essential object of the present invention is to provide a data recording for a data recording and reproducing apparatus having the data structure for defect management which enables recording of both the real time data and the random access data, and also enables sequential reproduction of the real time data.

In accomplishing the above-described object, in a data recording medium for the apparatus of the present invention a sequential access zone consisting of a data area for recording real time data, a C list area for recording a C defect list managing defective sectors detected in the formatting process and a G list area for recording a G defect list managing defective sectors detected in the recording process are allocated a random access zone consisting of a data area for recording random access data, a spare area for replacing defective sectors detected in the recording process and an R list area for recording an R defect list managing the relationship between the defective sectors and corresponding spare sectors, and a volume control area for recording a volume control block having control data of each area are also allocated.

A data recording/reproducing apparatus of the present invention is an apparatus for recording data for every sector of and reproducing data for every sector from the data recording medium allocated with areas as described hereinabove. The data recording/reproducing apparatus is provided with an area allocating means for allocating the sequential access zone, random access zone and volume control area, a C defect management means for forming a C defect list managing the defective sectors detected through certification of all the sectors included in the data area of the sequential access zone, an area controlling means for forming a volume control block having control data of each area allocated on the disk, an area discriminating means for discriminating in which of the sequential access zone and random access zone a data recording area or a data reproducing area is included, an address setting means for determining a target sector in the sequential access zone while skipping defective sectors registered in the C defect list, or setting a spare sector as a target sector in place of a defective sector registered in the R defect list in the random access zone, a G defect management means for forming a G defect list management defective sectors detected in the recording process in the sequential access zone, a spare sector allocating means for allocating a spare sector to a defective sector detected in the recording process in the random access zone, and an R defect management means for forming an R defect list controlling defective sectors detected in the recording process in the random access zone.

In the above-described structure, both the sequential access zone recording real time data and the random access zone recording random access data are allocated within the data recording medium of the present invention. Data is recorded while the C defect list and G defect list are skipped in the sequential access zone, thereby enabling sequential reproduction of the real time data.

BRIEF DESCRIPTION OF THE DRAWINGS

These and other objects and features of the present invention will become apparent from the following description taken in conjunction with one preferred embodiment thereof with reference to the accompanying drawings, in which:

FIG. 3 shows the structure of data in a volume control block;

FIGS. 4(a)-4(c) shows the structure of data in a defect list;

FIGS. 10(a)-10(c) are diagrams showing the corresponding relation between a logical address and a physical address.

DESCRIPTION OF THE PREFERRED EMBODIMENTS

Figure 1:
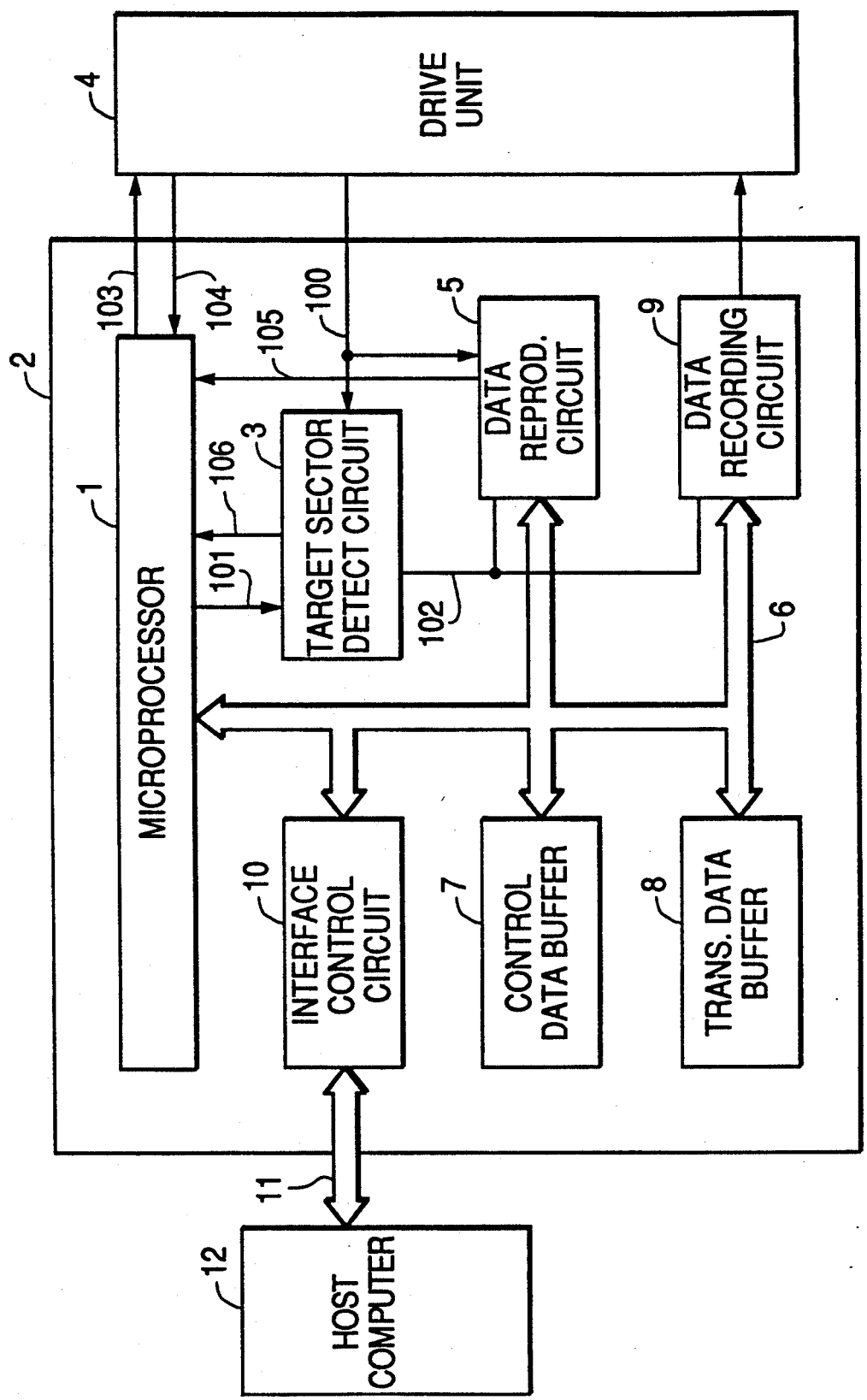
FIG. 1 is a block diagram of a data recording/reproducing apparatus according to one preferred embodiment of the present invention.

Before the description of the present invention proceeds, it is to be noted here that like parts are designated by like reference numerals throughout the accompanying drawings.

A data recording medium and a data recording/reproducing apparatus using the data recording medium according to the present invention will be described with reference to the drawings.

Figure 2:
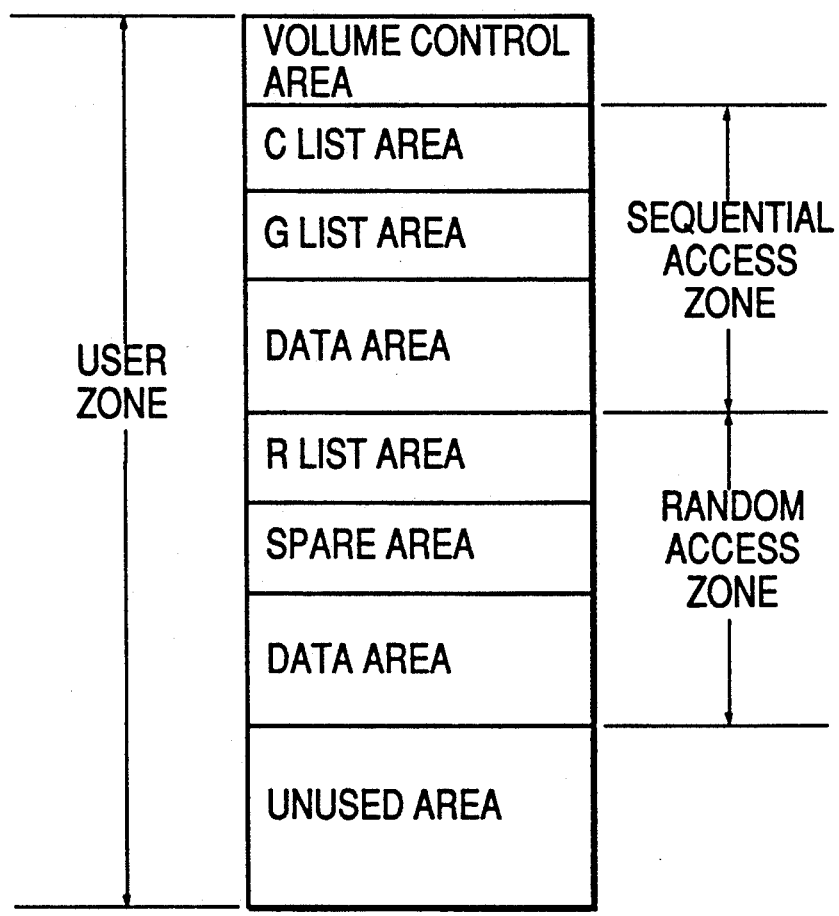
FIG. 2 shows the structure of areas in a data recording medium for use with one preferred embodiment of the present invention.

FIG. 2 is a structural diagram of areas of a data recording medium used with one preferred embodiment of the present invention. In FIG. 2, a volume control area is allocated at the head of a user zone of the disk-shaped data recording medium divided into units of sectors. Subsequent to the volume control area, a sequential access zone for recording the real time data and a random access zone for recording the random access data are allocated. The sequential access zone is composed of a data area for recording user data, a C list area for recording a C(certification) defect list which manages defective sectors detected in the data area through certification in the formatting process, and a G list area for recording a G(grown) defect list which manages defective sectors newly detected in the data managing process. On the other hand, the random access zone is composed of a data area for recording a user data, a spare area for recording spare sectors, and an R List Area for recording an R(replaced) defect list which manages the corresponding relationship between the defective sectors detected in the data recording and the spare sectors. The arrangement of these zones and the volume of each area are parameters dependent on the operating conditions or the disk quality, which are set by the use of a format parameter. A volume control block having control data of the areas of each zone is recorded in the volume control area. It is to be noted here that the volume control block and each defect list are multi-recorded in FIG. 2 for improvement of the reliability.

FIG. 3 is a structural diagram of data in the volume control block. A VCB identifier, a control data of volume control area (for example, head address and volume), number of zones allocated in the user zone, a control data of an unused area, etc. are recorded as a VCB header at the head of the volume control block. A zone entry is recorded following the VCB header corresponding to each zone allocated in the user zone. In this case, if the sequential access zone and random access zone are present in the user zone as indicated in FIG. 2, two zone entries are recorded in the volume control block. A zone identifier for distinguishing the sequential access zone and random access zone, and control data (for example, head address and volume) of three areas constituting the sequential access zone, i.e., C list area, G list area and data area are recorded in this order in the zone entry (1) for managing the sequential access zone. Similarly, a zone identifier and control data of three areas constituting the random access zone, i.e., R list area, spare area and data area are recorded in this order in the zone entry (2) managing the random access zone.

FIGS. 4(a)-4(c) are structural diagrams of the defect list. FIG. 4(a) shows the whole structure common to the three defect lists. As shown in FIG. 4(a), a defect list identifier for distinguishing the kind of the defect list and a list length are recorded at the head of the defect list, and a defect entry is subsequently recorded. FIG. 4(b) is a structural diagram of a defect entry used in the C defect list or G defect list, while FIG. 4(c) illustrates the structure of a defect entry used in the R defect list. As shown in FIG. 4(b), in the defect entry used in the C and G defect lists, in a fashion similar to the Primary Defect List described with reference to the conventional example, a defective sector address is recorded as a word having a 4-byte length. Further, the defect entry used in the R defect list is composed of a control flag for distinguishing from which of the data area and spare area the defective sector is detected, a defective sector address and a spare sector address both expressed by words of 4-byte length. Since the defective sector detected in the spare area is not provided with a corresponding spare sector, a spare sector address of the defect entry controlling this defective sector is not used. In FIG. 4(c), although the defective sector detected from the data area is distinguished from the defective sector detected from the spare area by means of the control flag, it can be distinguished by recording a sector address, for example, (FFFFFFFF)h not present on the disk as a spare sector address, without using the control flag.

FIG. 1 is a block diagram of a data recording/reproducing apparatus according to the preferred embodiment of the present invention. In FIG. 1, a microprocessor 1 controls the whole of a controller 2 in accordance with the controlling procedures stored therewithin. A target sector detecting circuit 3 demodulates an address signal recorded in an ID field of the sector from a reproducing signal 100 fed from a drive unit 4, thereby detecting or not the address signal is coincident with a target sector address 101 set by the microprocessor 1. When a data reproducing circuit 5 is actuated by a detecting signal 102 fed from the target sector detecting circuit 3, it demodulates a data signal recorded in a data field of the sector from the reproducing signal 100 and then performs error correction to obtain read data. The read data is sent to a control data buffer 7 or a transfer data buffer 8 via a data bus 6. The detecting signal 102 also drives a data recording circuit 9. When the data recording circuit 9 is started, it adds an error correction code to the write data from the control data buffer 7 or transfer data buffer 8 through the data bus 6, and modulates and feeds the data to the drive unit 4, so that the data is recorded in the data field of the target sector. An interface control circuit 10 is connected to a host computer 12 through a host interface 11 such as a small computer system interface or the like, transmitting control data, e.g., a device command or sense data to and from the microprocessor 1 through the data bus 6. Moreover, the interface control circuit 10 transmits the write data and read data to and from the data buffer 8. The control data buffer 7 temporarily stores a defect list used by the volume control block or for defect management.

Figure 5:
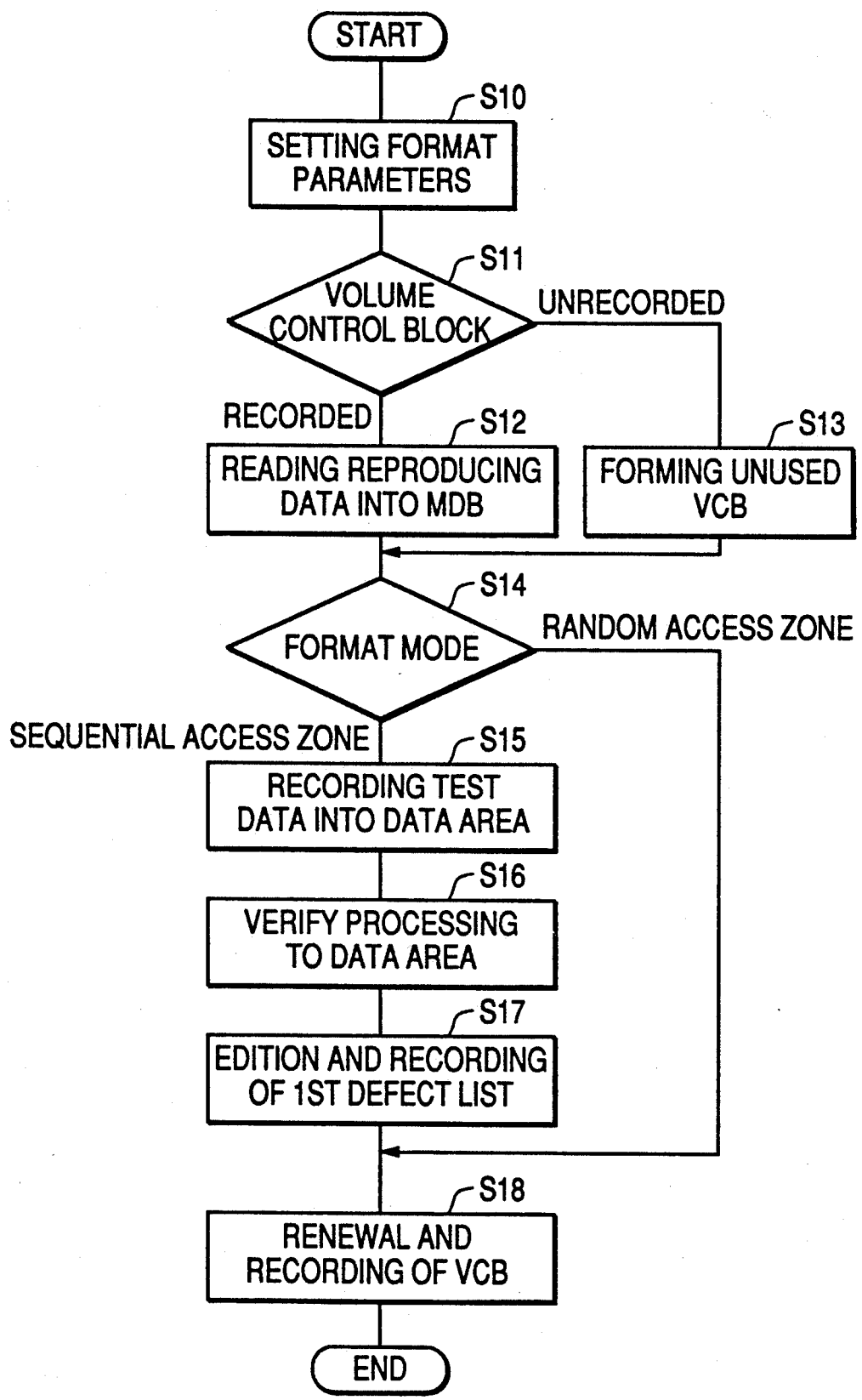
FIG. 5 is a flowchart of the formatting process.

The formatting process performed by the data recording/reproducing apparatus in the above-described structure will be described with reference to the flowchart of FIG. 5. It is to be noted here that the volume control block and each defect list are assumed to be the size of one sector for simplification of description.

(S10): When a device command (e.g., MODE SELECT command) is sent out from the host computer 12, the interface control circuit 10 transmits the device command to the microprocessor 1 through the data bus 6. The microprocessor 1, in recognition of the device command, receives a format parameter subsequently fed from the host computer 12 and retains the parameter thereinside. This format parameter includes a format mode to distinguish the sequential access zone or random access zone and control data of each area allocated within the zone.

(S11): After the format parameter is set, when the host computer 12 generates a next device command (e.g., FORMAT UNIT command), the microprocessor 1 in turn reads out the volume control block from the disk mounted in the drive unit 4, thereby executing the reading process as follows. That is, the microprocessor 1 sends a drive command 103 to command a seek operation to the volume control area. When the seek process is completed, the drive unit 4 sends out drive sense data 104 to notify the microprocessor 1 of the completion of the seek operation. Then, the microprocessor 1 sets an address of the volume control area as a target sector address 101, when the target sector detecting circuit 3 demodulates the address signal from the reproducing signal 100 so as to thereby check the coincidence with the target sector address 101. When the address signal is detected to be coincident with the target sector address 101, the target sector detecting circuit 3 sends out the detecting signal 102, thereby actuating the data reproducing circuit 5.

(S12): If the volume control area is already recorded, the data reproducing circuit 5 demodulates the reproducing signal 100 fed from the drive unit 4 to perform error correction. The read-out volume control block is transferred to the control data buffer 7 and stored there.

(S13): On the contrary, if the volume control area is not recorded yet, the data reproducing circuit 5 sends out an error detecting signal 105, having a flag set to show that the volume control area is not recorded, to the microprocessor when the data modulation has not started even after a predetermined time (for example, the rotating time corresponding to 10% or more of the data field) or more has passed since the target sector is detected. As a result, the microprocessor 1 forms a volume control block indicating that the whole of the disk is in the unused state, and records the block in the control data buffer 7.

(S14): The microprocessor 1 generates a zone entry corresponding to the format parameter transferred in the procedure (S10) with referring to the content of the volume control block preserved in the control data buffer 7. The steps (S15) and (S16) will be skipped in the case where the random access zone is allocated by this format parameter.

(S15): In the case where the sequential access zone is allocated, the microprocessor 1 performs certification to the entire data area indicated by the format parameter in accordance with the steps (S15) and (S16). In the first place, the microprocessor 1 forms test data set by the format parameter within the transfer data buffer 8. Thereafter, the microprocessor 1 carries out the seek operation to the data area in the same manner as in the procedure (S11) and sets an address of the head sector in the data area in the target sector detecting circuit 3 while starting the recording process. When the detecting signal 102 is sent out from the target sector detecting circuit 3, the data recording circuit 9 adds an error correction code to the test data read from the transfer data buffer 8 and then modulates and sends the data to the drive unit 4. Accordingly, the data is recorded within the target sector. Recording of the test data as above is carried out for all of the sectors allocated as the data area. Meanwhile, defective sectors may be detected in some cases during the recording process of the test data. For example, if no coincidence of the addresses is detected even when a predetermined time (e.g., necessary for one rotation of the disk) has passed after the target sector address 101 is set, the target sector detecting circuit 3 sends a non-detecting signal 106 in place of the detecting signal 102, thereby informing the detection of a defective sector having an inappropriate address. When the defective sector is detected, the microprocessor 1 transfers the defective sector address to the control data buffer 7 to store it as one defect entry.

(S16): The microprocessor 1 verifies all the sectors where the test data are recorded. After the microprocessor 1 executes the seek process to the data area, it sets the address of the head sector in the data area to the target sector detecting circuit 3, whereby reproduction of the data is started. When the target sector detecting circuit 3 generates the detecting signal 102, the data reproducing circuit 5, upon receipt of the detecting signal 102, demodulates the data signal from the reproducing signal 100, executing error correction and transferring the read data to the transfer data buffer 8. If the detected error is outside the permissible range which is set lower than the correcting ability, the data reproducing circuit 5 outputs the error detecting signal 105 set with a verify error flag. In the case where this verify error flag is detected, the microprocessor 1 transfers the address of the defective sector to the control data buffer 7, so that the defective sector is stored as one defect entry.

(S17): The microprocessor 1 counts the number of defect entries stored in the control data buffer 7 in procedures (S15) and (S16). Moreover, the microprocessor 1 sorts the defect entries from the upper one. Accordingly, the C defect list is formed. Unless the sum of the defective sectors detected through the certification exceeds the permissible range set by the format parameter, the microprocessor 1 starts the recording of data to the C list area in accordance with the controlling procedure described in (S15). At this time, when the target sector is detected, the data recording circuit 9 reads out the C defect list as the write data from the control data buffer 7 and, after adding an error correction code to the list, the circuit 9 modulates and records the data within the target sector.

(S18): The microprocessor 1 adds the zone entry newly formed in the procedure (S14) to the volume control block stored in the control data buffer 7, and at the same time, updates the stored number of zones and control data of the unused area so as to thereby form a new volume control block. Then, the microprocessor 1 records the updated volume control block in the volume control area in a procedure similar to that of step (S17). Finally, the microprocessor 1 sends out a status signal indicating the completion of the formatting process to the host computer 12 through the interface control circuit 10.

In the above-described formatting process, the description is based on the fact that the test data is formed by the microprocessor 1 in the procedure (S15). However, it is possible to transfer and use the test data from the host computer 12 as in the general recording process. Moreover, although it is so arranged in the procedure (S13) that an unused sector is detected if the demodulation of data has not started even when a predetermined time has passed after the target sector has been detected, it may be possible that the data reproducing circuit 5 checks the state of the reproducing signal 100 to detect the above useless passage of the predetermined period of time. In the procedure (S16), the data reproducing circuit 5 detects the error included in the reproducing data during the error correction, thereby determining the verify error. Instead, the microprocessor 1 may compare the reproducing data transferred with the test data for every byte, so as to thereby determine the verify error. Furthermore, the procedure (S17) is described on the assumption that the total number of the defective sectors detected during the certification does not exceed the permissible range. However, when many defective sectors are found so as to exceed the permissible range, the microprocessor 1 aborts the procedure and informs the host computer 12 of a medium error through the interface control circuit 10.

Figure 6:
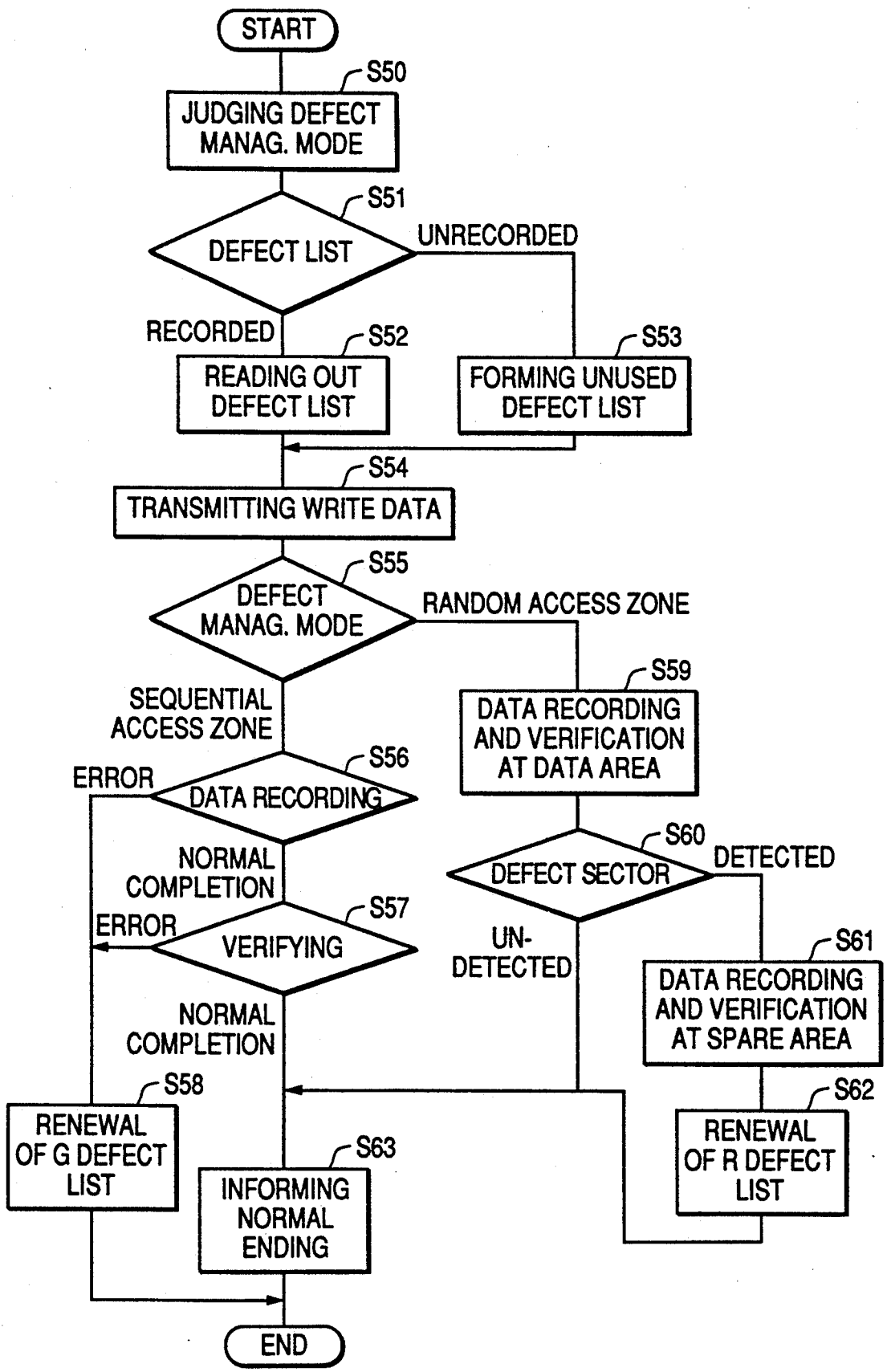
FIG. 6 is a flowchart of the data recording process.

Now, the recording process accompanied by the detection of defective sectors and the replacement thereof will be discussed with reference to the flowchart of FIG. 6. It is to be noted here that the volume control block is, after being read out from the disk in the same manner as in the procedures (S11) and (S12) described earlier, preserved within the control data buffer 7 when the disk is loaded or when the apparatus is reset.

(S50): The host computer 12 sends out a device command (WRITE command) indicating a data recording area. Consequently, upon reading the device command taken into the interface control circuit 10, the microprocessor 1 reads out a zone entry where the data recording area is included with reference to the volume control block preserved within the control data buffer 7. The microprocessor 1 decides the defect management mode by checking from the zone identifier in which the data recording area is included, sequential access zone or random access zone.

(S51): The microprocessor 1 detects an address of the defect list from the read-out zone entry. According to a procedure similar to that of (S11), the microprocessor 1 starts reproduction the of the defect list. The defect list referred to in the following procedures (S52) and (S53) indicates the C defect list and G defect list when the data recording area exists within the sequential access zone, or the R defect list when the data recording area exists within the random access zone.

(S52): If the defect list area is already recorded, the data reproducing circuit 5 transmits the defect list to the control data buffer 7 along the procedure similar to (S12). This defect list is preserved in an area different from the volume control block within the control data buffer 7. Subsequently, the microprocessor 1 retrieves the defective sector included in the data recording area from the defect list, and retains the detected defect entry thereinside.

(S53): On the other hand, if the defect list area is not recorded, the data reproducing circuit 5 outputs the error detecting signal having a flag set to show that the defect list area is not yet recorded in accordance with a procedure similar to that of (S13). At this time, the microprocessor 1 forms a defect list having a defect list length set 0 and preserves the list in the control data buffer 7.

(S54): The microprocessor 1 drives the interface control circuit 10 to transfer the write data from the host computer 12 to the transfer data buffer 8.

(S55): When the data recording area is within the sequential access zone, the microprocessor 1 performs recording of the data in accordance with the procedures (S56) through (S57). If the data recording area is within the random access zone, the microprocessor 1 performs recording of the data in accordance with the procedures from (S59) to (S62).

(S56): The microprocessor 1 changes the logical address set by the device command to a physical address on the disk with referring to the C defect list. In other words, in a fashion to that of the conventional example wherein the logical address is changed to an intermediate address with the help of the Primary Defect List, the physical address is assigned for each sector from the head of the sequential access zone while the physical address of the defective sector stored in the C defect list is skipped. Then, the microprocessor 1 carries out recording of the data from the start sector in the data recording area after adding an error correction signal to the write.. data preserved in the transfer data buffer 8 and modulating it, in a fashion similar to that of the procedure (S15). When a new defective sector is detected during the recording of the data, the microprocessor 1 preserves the physical address of the defective sector thereinside, and aborts the recording.

(S57): The recording is normally finished, the microprocessor 1 changes the addresses in the same manner as in the procedure (S56). Verification is conducted in the same manner as in the procedure (S16) to each sector where the data is recorded. If a new defective sector is found during the verification, the microprocessor 1, while preserving the physical address of the defective sector, aborts the verification.

(S58): Moreover, when a new defective sector is detected in the procedure (S56) or (S57), the microprocessor 1 also stores the defect entry having the physical address of the defective sector in the G defect list stored in the control data buffer 7. At this time, the updated G defect list is recorded in the G list area in a manner similar to that of (S18) unless the total number of defective sectors stored in the C and G defect lists exceeds the permissible range. The microprocessor 1 further forms sense data including the defective sector address, and transfers it to the host computer 12 through the interface control circuit 10.

(S59): With reference to the R defect list, the microprocessor 1 changes the logical address indicated by the device command to a physical address on the disk. That is, if the defective sector stored in the R defect list is included in the data recording area, the spare sector address recorded in the defect entry is used as a logical address of the target sector. The microprocessor 1 adds an error correction code to the write data kept in the transfer data buffer 8 in a fashion to that of the procedure (S15), and after modulating it, performs recording of the data from the start sector in the data recording area. During this recording of data, the defective sectors stored in the R defect list are skipped. Moreover, when a new defective sector is detected during this recording, the microprocessor 1 preserves the physical address of the defective sector thereinside. Then, the microprocessor 1 subsequently continues recording of the data in a succeeding sector. When the of the data is completed, the microprocessor 1 performs verification of each sector in the same manner as in the procedure (S16). The microprocessor 1 also preserves the physical address of a defective sector when a new defective sector is detected during the verification. The microprocessor 1 subsequently performs verification in the succeeding sector.

(S60): In the case where there is the already-stored defective sector in the R defect list or a new defective sector is detected in the procedure (S59), the microprocessor 1 carries out recording of the data in the spare area in accordance with the procedures (S61) and (S62).

(S61): The microprocessor 1, referring to the R defect list within the control data buffer 7, allocates an unused spare sector to the newly-detected defective sector. It is normal to use the spare sectors from one with a smaller physical address in the spare area. Further, an address of the spare sector for the defective sector stored in the R defect list is preserved in the corresponding defect entry. The microprocessor 1 carries out data recording and verification in the spare sector by using the write data stored in the transfer data buffer 8. If recording and verification for the spare sectors are normally finished, the microprocessor 1 forms a control flag indicative of the detection of the defective sector from the data area and a defect entry having addresses of the defective sector and spare sector as indicated in FIG. 4(c). Meanwhile, if a defective sector is found during recording of the data or verification in the spare sector, the microprocessor 1 forms a control flag indicative of the detection of the defective sector from the spare area and a defect entry having an address of the defective sector, keeping the flag thereinside. At this time, the microprocessor 1 allocates a new spare sector again, and then performs recording and verification.

(S62): When the defect entry is formed in the procedure (S61), i.e., a new defective sector is detected in the data area or spare area, the microprocessor 1 adds and stores the defect entry in the R defect list in the control data buffer 7. At this time, if the total number of defective sectors stored in the R defect list does not exceed the permissible range, the updated R defect list is recorded in the R list area in a fashion similar to that of the procedure (S18).

(S63): When recording and verification end normally, the microprocessor 1 feeds a command status showing that the command is normally completed to the host computer 12 through the interface control circuit 10.

In the manner as described hereinabove, data is recorded in accompaniment with detection and replacement of a defective sector. In the procedure (S58), when a defective sector is newly detected from the data recording area to be included in the sequential access zone, a verify error is detected and transmitted to the host computer 12. Thus, the command is completely executed. The notification of the error as above allows the host computer 12 to control the position of the new defective sector and the total number of defective sectors included in the subject zone. For recovery of the error, the host computer 12 can reissue a device command to record the same data from a sector following the defective sector. Accordingly, the defective sector detected during recording of the data in the sequential access zone is never used as a data recording area. However, if it is found out in the procedure (S52) that the defective sector already stored in the G defect list is included in the data recording area, the microprocessor 1 can abort the execution of the command, while informing the host computer 12 of the parameter error.

In addition, when a defective sector is detected during recording or verification in the spare sector in the procedure (S61), the microprocessor 1 allocates a new spare sector. If the disk is dirty or the recording material is found degradated, however, the newly-allocated spare sector may be detected as being a defective one. Therefore, the microprocessor 1 is designed not to allocate a new spare sector when a plurality of spare sectors are continuously detected as being defective ones during the replacement of the same defective sector, but aborts the execution of the command, while informing the host computer 12 of the medium error.

Furthermore, the procedure (S58), the G defect list is updated and recorded based on the assumption that the sum of the defective sectors included in the sequential access zone does not exceed the permissible range. Likewise, in the procedure (S62), the R defect list is updated and recorded on the assumption that the sum of the defective sectors included in the random access zone does not exceed the permissible range. However, if the disk is dirty or the recording material is found to be degradated, many defective sectors beyond the permissible range are eventually detected. At this time, the microprocessor 1 aborts the execution of the command, and notifies the host computer 12 of the medium error.

According to the procedure (S61), the defect entry consisting of the control flag, defective sector address and spare sector address as shown in FIG. 4(c) is recorded in the R defect list. However, the defect entry may be constituted of the defective sector address and spare sector address. A sector address not present on the disk is recorded as the spare sector address in the defect entry for the defective sector detected in the spare area.

Figure 7:
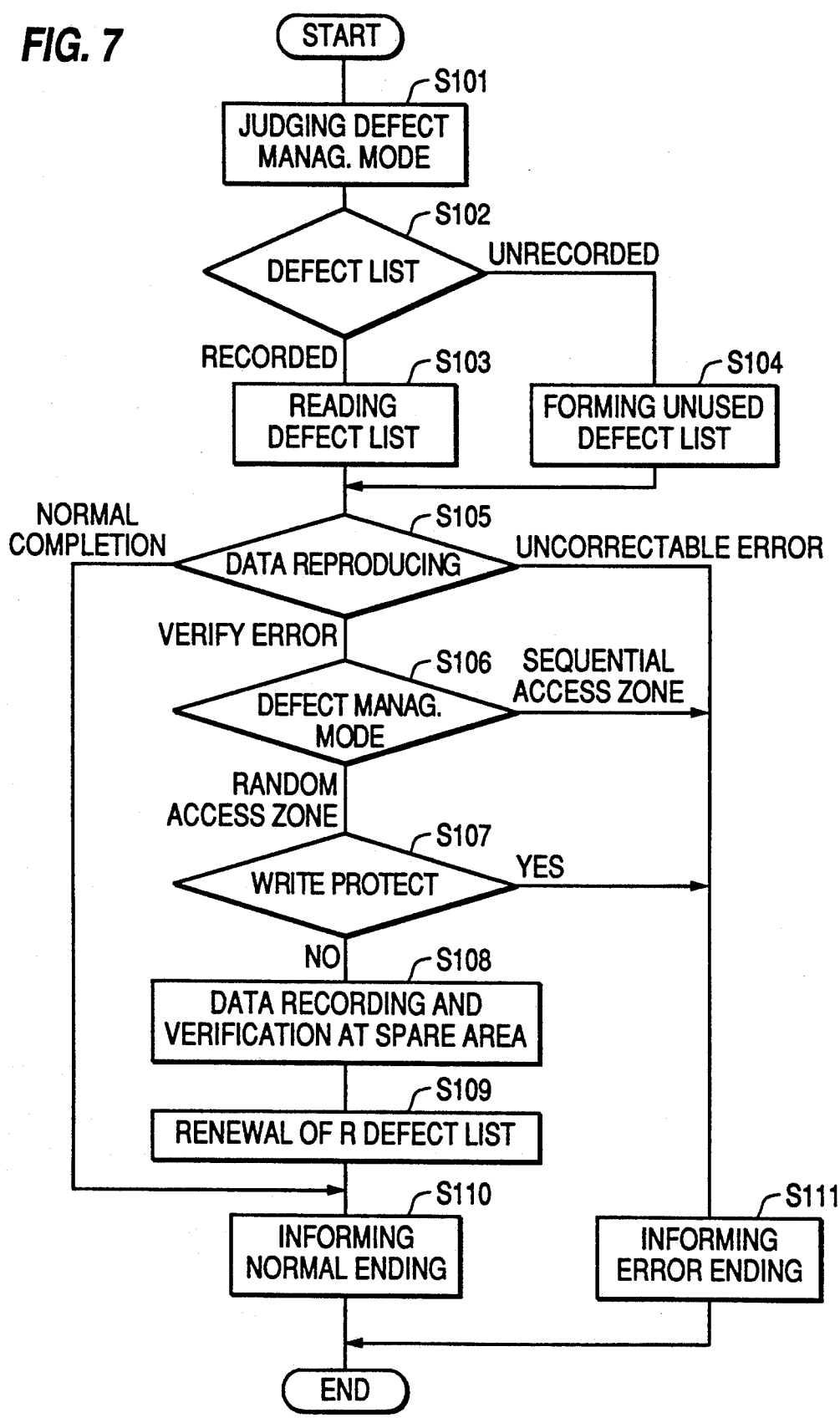
FIG. 7 is a flowchart of the data reproducing process.
Figure 8:
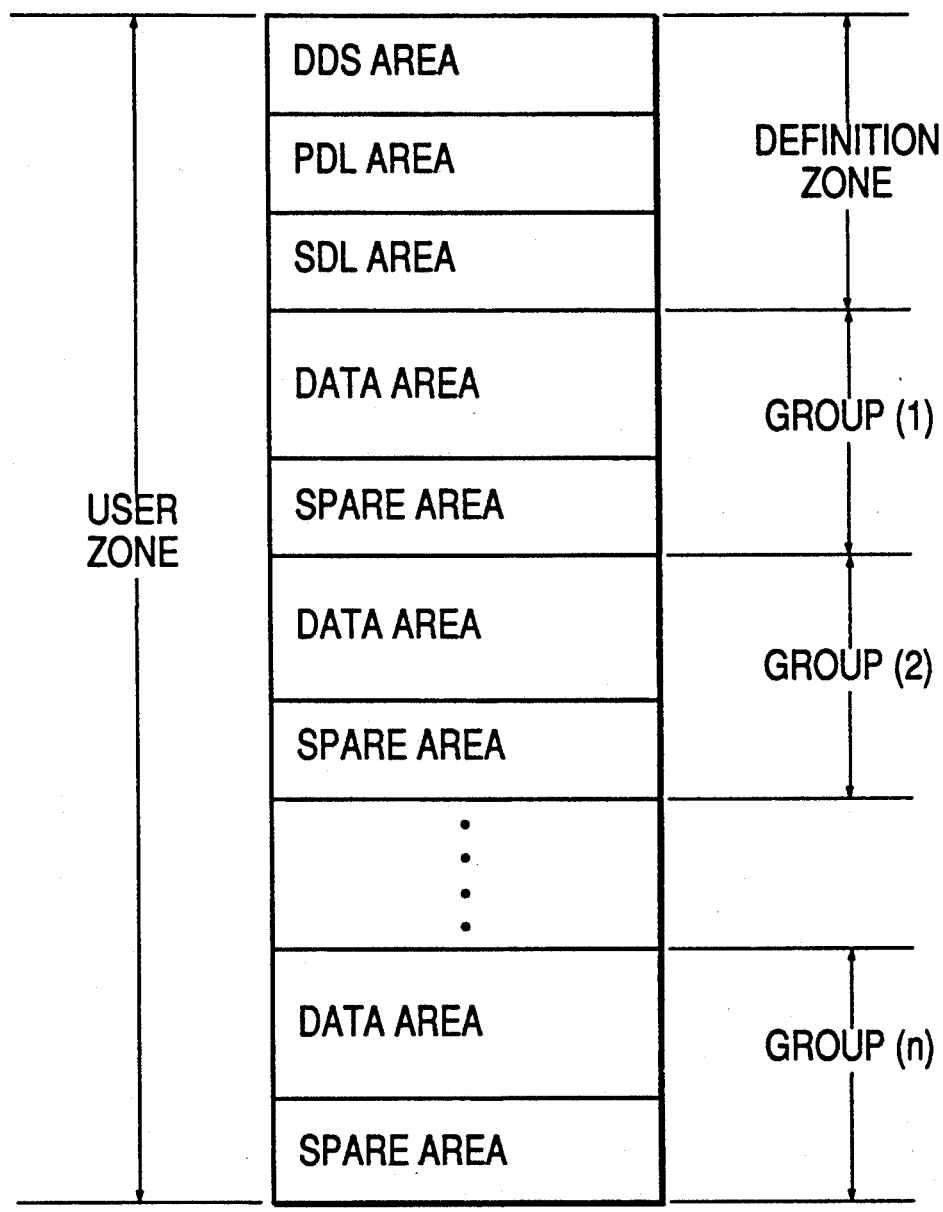
FIG. 8 is a structural diagram of areas in a conventional data recording medium.
Figure 9A:
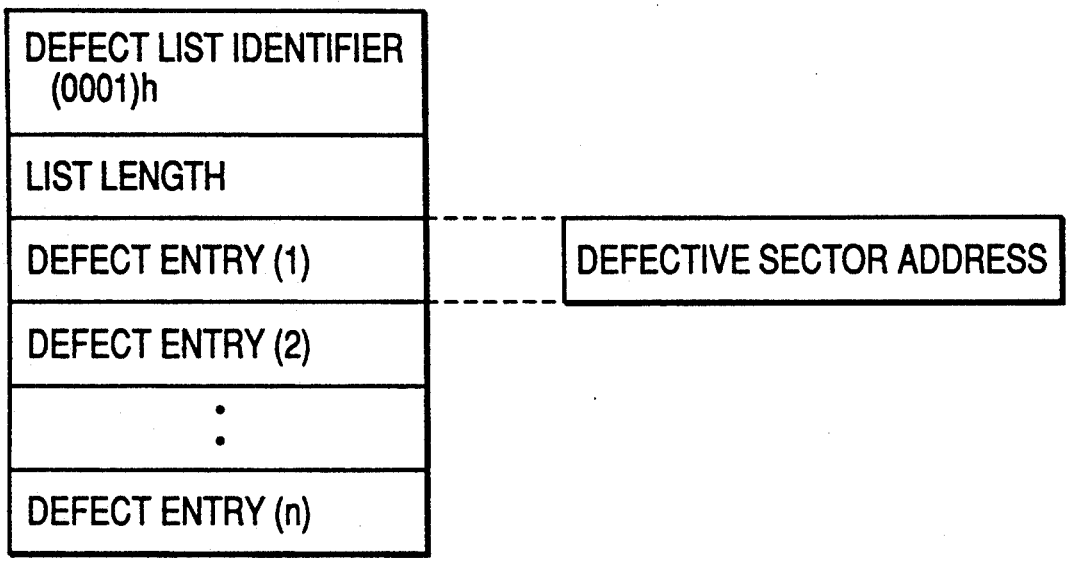
FIGS. 9(a) and 9(b) are structural diagrams of data in a conventional defect list.
Figure 9B:
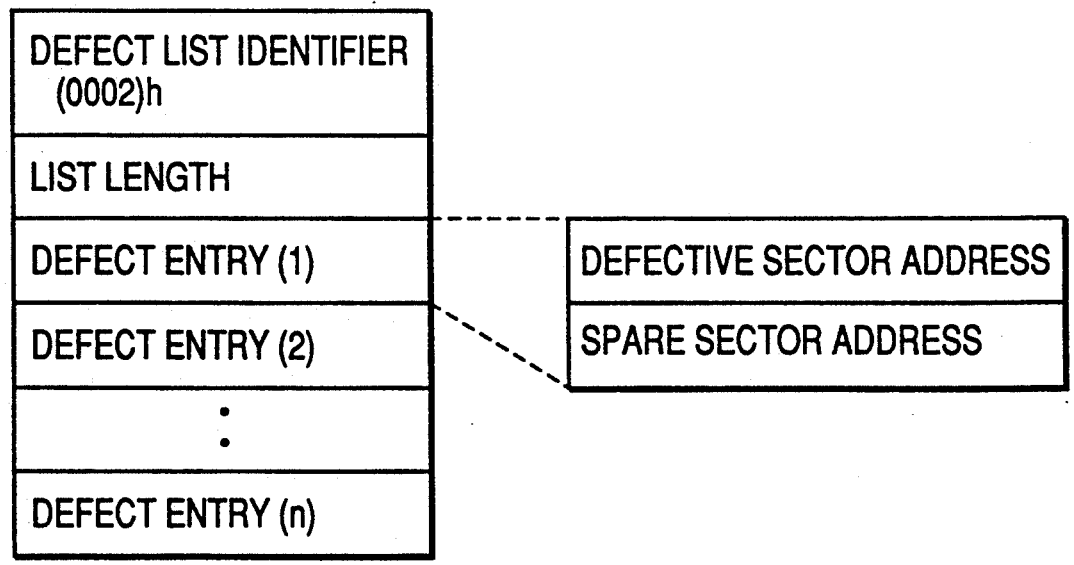

Reproduction of data will be explained hereinbelow according to the flowchart shown in FIG. 7. In the following explanation, it is assumed that the volume control block is read out from the disk in a fashion similar to that of the procedures of (S11) and (S12) and is kept in the control data buffer 7.

(S101): When a device command (a READ command) indicating a data reproduction area is sent out from the host computer 12, the microprocessor 1 reads out the same from the host interface circuit 10. Then the microprocessor 1 searches the zone entry including the data reproduction area in the volume control block in a manner similar to that of the procedure (S50) and judges the defect management mode of the data reproduction area.

(S102): The microprocessor 1 reads the address of the defect list area from the zone entry searched. Then, it starts the reproduction process of the defect list in a manner similar to that of the procedure (S11). The defect list used in the following procedures (S103) and (S104) indicates the C and G defect lists if the data reproduction area is in the sequential access zone and, if it is in the random access zone, the same indicates the R defect list.

(S103): When data have been recorded in the defect list area, the data reproduction circuit 5 transmits the defect list read out to the control data buffer 7 in a manner similar to that of the procedure (S12). Then, the microprocessor 1 searches defective sectors included in the data reproduction area according to the defect list and retains the defect entry detected therein.

(S104): If no data is recorded in the defect list area, the data reproduction circuit 5 sends out an error detection signal 105 wherein an unrecorded flag is set. At this time the microprocessor 1 generates a defect list the length of which is set at zero and retains it in the control data buffer 7.

(S105): The microprocessor 1 converts the logical address of a target sector to a physical sector address on the disk referring to the C defect list if the data reproduction area is in the sequential access zone or the R defect list if it is in the random access zone. Next, after performing a seek operation in the target sector, the microprocessor 1 starts the data reproduction by setting the target sector address in the target sector detection circuit 3. When a detection signal 102 is sent out from the target sector detection circuit 3, the data reproducing circuit 8 performs an error correction proceeding after demodulating data from the reproduction signal 100 and send the read data to the transfer data buffer 8. Next, the microprocessor 1 starts the interface control circuit 10 and transmits the read data from the transfer data buffer 8 to the host computer 12. The data reproduction in unit of sector is performed for all sectors allocated as the data reproduction area. The data reproduction circuit 8 may dected one or more new defective sectors by counting a number of error symbols included in the read data during the error correction process. There are two kinds of defective sectors among the defective sectors detected. One is a read error sector wherein an uncorrectable error is detected which indicates the number of error symbols exceeds the ability of error correction, and the other is a verify error sector wherein a verify error in which the number of is detected symbols is smaller than the ability of error correction but exceeds the permissible range. When the read error sector is detected, the microprocessor 1 aborts the execution of commands after retaining the physical address of the read error sector therein. When the verify error sector is detected, the microprocessor 1 performs the data reproduction for the following sectors after retaining the physical address of the verify error sector.

(S106): When a verify error is detected during the data reproduction, the microprocessor 1 checks the defect management mode of the data reproduction area to judge whether or not the verify error sectors should be replaced.

(S107): Next, when the data reproduction area is in the random access zone, the microprocessor 1 generates a drive command 103 to the disk drive 4 to judge if data recording is possible. The disk drive 4 checks a write protect tab provided in a disk cartridge (not shown) and sends a drive sense data 104 wherein the state of the tab is set to the microprocessor 1. The same 1 checks the drive sense data 104 and, when the state is not the write protect state, the data recording operation to a spare sector is carried out instead of the verify error sector according to the following procedures (S108) and (S109).

(S108): The microprocessor 1 allocates of the spare sector and performs the data recording and verification in the spare sector, as explained in the procedure (S61), and makes and retains a defect entry. In the data recording in the spare sector, the microprocessor uses the read data having been corrected and held in the data transfer buffer 8 in the procedure (S105).

(S109): Next, the microprocessor 1 stores the defect entry managing new defective sectors to the R defect list held in the control data buffer 7. Then, the renewed R defect list is recorded in the R defect list area in a manner similar to that of the procedure (S18).

(S110): When no defective sector is detected in the procedure (S105) or the detected verify error sector is replaced in the procedure (S106), the microprocessor 1 sends a command status indicating a normal completion of the command execution to the host computer 12 via the host interface circuit 10.

(S111): When an uncorrectable error sector is detected in the procedure (S105), the detected verify error sector is determined to be included in the sequential access zone in the procedure (S106) or it is judged that it is impossible to carry out the replacement in the procedure (S107), and the microprocessor 1 transmits the uncorrectable error or verify error to the host computer 12 via the host interface circuit 10.

According to the procedures mentioned above, the data reproduction accompanying the replacement of the verify error sector is carried out.

It is to be noted that the uncorrectable error and the verify error to be detected in the procedure (S105) are judged according to the following criteria. According to the sector format proposed in the Draft Proposal 10089 presented by ISO/SC23, data of 106 symbols and parity codes of 16 symbols per one interleave are recorded. Since errors of up to 8 symbols are correctable in one interleave, an uncorrectable error is judged when errors above 9 symbols are detected. Further, the detection level of the verify error is set taking into consideration the drive interchangeability, and media degradation due to long term storage and usually, a verify error is judged when errors equal to or more than 4 symbols and smaller than 8 symbols are detected.

Although the present invention has been fully described in connection with the preferred embodiments thereof with reference to the accompanying drawings, it is to be noted that various changes and modifications are apparent to those skilled in the art. Such changes and modifications are to be understood as being included within the scope of the present invention as defined by the appended claims unless they depart therefrom.

What is claimed is:

1. A data recording/reproducing apparatus for recording/reproducing data in unit of sector to a disk-shaped data recording medium, which comprises:

sector detecting means for detecting a target sector to which recording/reproduction of data is executed and detecting a defective sector having an inappropriate address;

data reproducing means for demodulating a reproducing signal from said target sector to perform error detection/correction and detecting an unrecorded sector;

transfer data preserving means for temporarily preserving a read data read out from said target sector and a write data to be recorded into said target sector;

control data preserving means for temporarily preserving a volume control block having control data of respective areas defined on said medium and all defect lists cited below;

data recording means for adding an error correction code to said write data preserved by said transfer data preserving means and said control data preserving means, and modulating the same to record the same to said target sector;

interface control means for controlling transfer of commands or data to and from a host computer;

area allocating means for allocating a sequential access zone consisting of a data area, a C list area and a G list area, a random access zone consisting of a data area, a spare area and an R list area, and a volume control area;

C defect management means for forming a C defect list which manages defective sectors detected through certification of all the sectors included in said data area of the sequential access zone;

area control means for forming said volume control block;

area discriminating means for discriminating in which zone, sequential access zone or random access zone, a data recording area or a data reproducing area is included;

address setting means for indicating a target sector while skipping defective sectors registered in said C defect list in said sequential access zone, whereas, indicating a spare sector as a target sector in place of the defective sector registered in an R defect list in said random access zone;

G defect management means for forming a G defect list for managing a defective sector detected in the recording process in said sequential access zone;

spare sector allocating means for allocating a spare sector to a defective sector detected in said random access zone; and R defect management means for forming said R defect list for managing defective sectors detected in said random access zone.

2. A data recording/reproducing apparatus as set forth in claim 1, wherein said sector detecting means detects a defective sector with an improper address when no coincidence with a target sector address is detected within a predetermined time.

3. A data recording/reproducing apparatus as set forth in claim 1, wherein said data reproducing means judges that an unrecorded sector is detected when demodulation of data is not started even a predetermined time later after detection of a target sector.

4. A data recording/reproducing apparatus as set forth in claim 1, wherein said G defect management means notifies a medium error when the total number of detective sectors registered in said C and G defect lists exceed a predetermined permissible range.

5. A data recording/reproducing apparatus as set forth in claim 1, wherein said spare sector allocating means notifies a medium error without allocating a spare sector when a plurality of spare sectors are continuously detected as defective.

6. A data recording/reproducing apparatus as set forth in claim 1, wherein said R defect management means uses a defect entry having a control flag which distinguishes defective sectors detected in said data area from defective sectors detected in said spare area.

7. A data recording/reproducing apparatus as set forth in claim 1, wherein said R defect management means uses an address which is not present on said data recording medium as a spare sector address of a defect entry controlling defective sectors detected from said spare area.

* * * * *